US009366331B2

(12) United States Patent
Eberhardt

(10) Patent No.: US 9,366,331 B2
(45) Date of Patent: Jun. 14, 2016

(54) TRANSMISSION COVER WITH IMPROVED AIRFLOW

(71) Applicant: Arctic Cat Inc., Thief River Falls, MN (US)

(72) Inventor: Ryan Eberhardt, West Fargo, ND (US)

(73) Assignee: Arctic Cat Inc., Thief River Falls, MN (US)

(*) Notice: Subject to any disclaimer, the term of this patent is extended or adjusted under 35 U.S.C. 154(b) by 182 days.

(21) Appl. No.: 13/948,007

(22) Filed: Jul. 22, 2013

(65) Prior Publication Data
US 2015/0024890 A1    Jan. 22, 2015

(51) Int. Cl.
F16H 57/04      (2010.01)
F16H 57/035    (2012.01)

(52) U.S. Cl.
CPC ........ *F16H 57/0416* (2013.01); *F16H 57/0489* (2013.01); *F16H 57/035* (2013.01)

(58) Field of Classification Search
CPC .................................................... F16H 57/0416
USPC ............................................................ 474/93
See application file for complete search history.

(56) References Cited

U.S. PATENT DOCUMENTS

| | | | | |
|---|---|---|---|---|
| 6,267,700 | B1* | 7/2001 | Takayama | 474/93 |
| 7,427,248 | B2* | 9/2008 | Chonan | 474/93 |
| 7,686,123 | B2* | 3/2010 | Ishida | 180/346 |
| 8,157,038 | B2* | 4/2012 | Ishida et al. | 180/68.1 |
| 8,317,653 | B2* | 11/2012 | Nogi | 477/37 |
| 8,596,406 | B2* | 12/2013 | Itoo et al. | 180/339 |
| 8,834,307 | B2* | 9/2014 | Itoo et al. | 474/93 |
| 8,911,312 | B2* | 12/2014 | Itoo et al. | 474/93 |
| 2012/0289370 | A1* | 11/2012 | Yamanishi et al. | 474/93 |
| 2013/0090198 | A1* | 4/2013 | Itoo et al. | 474/93 |

* cited by examiner

*Primary Examiner* — William E Dondero
*Assistant Examiner* — Mark K Buse
(74) *Attorney, Agent, or Firm* — Lowe Graham Jones PLLC

(57) ABSTRACT

A cover for a transmission having improved airflow path is disclosed. The interior of the cover has a progressively narrowing airflow path to reduce pressure drop through the cover, thereby improving the cooling efficiency of the airflow through the cover. The cover includes a diverter sheltering the air inlet to the cover to prevent air in the cover from exerting outward pressure on the incoming air.

30 Claims, 5 Drawing Sheets

TRANSMISSION COVER WITH IMPROVED AIRFLOW

FIELD OF INVENTION

This invention relates generally to a case for a vehicle transmission such as a continuously variable transmission ("CVT") with an improved airflow path.

BACKGROUND OF THE INVENTION

All-terrain vehicles ("ATVs") and recreational off-road vehicles ("ROVs") generally feature CVTs to transmit power from the engine to the wheels. Like other moving parts of the vehicle, transmissions tend to generate heat during use that, if left unchecked, can be harmful to components of the engine. CVTs in particular generate heat due to the belt sides scrubbing against the sides of the sheaves anytime they are engaged and moving. CVTs are conventionally cooled by moving external air into the CVT cover and over the hot components and out of the cover. However, due to the rapid motion within the CVT cover and the intense space constraints in an engine and transmission, proper airflow is not always achieved efficiently. There is a demand in the art for improved, efficient cooling features for engines generally and specifically for CVTs.

SUMMARY OF THE INVENTION

The present invention is directed to a cover or case for a transmission. The transmission can be a CVT or another suitable transmission having a drive shaft and a driven shaft. The cover includes a first hole for accommodating one of the drive shaft or the driven shaft of the transmission and a second hole for accommodating the other one of the drive shaft and driven shaft. The cover has a lateral dimension measured in a direction parallel to the shafts, and a line passing between center points of the first and second holes separates the cover into a first side and a second side. The cover also has an air inlet near the first hole and an air outlet near the second hole. The cover has a deep region near the air inlet, a ramp region adjacent to the deep region, and a shallow region adjacent to the ramp region. The deep region has a larger lateral dimension than the shallow region and the ramp region slopes between the deep region and the shallow region. The deep region, ramp region, and shallow region are on the first side of the cover. Airflow through the cover is directed to pass into the air inlet, over the deep region, ramp region, and shallow region before exiting the cover. The cover also includes a high region between the air outlet and air inlet on the second side of the cover, having a smaller lateral dimension than the shallow region. A portion of the air from the shallow region passes over the high region before joining the incoming airflow at the inlet. The cover also has a ridge between the first and second holes and separating the ramp region and the high region and a diverter between the high region and the air inlet and positioned to prevent air from the high region from exerting pressure on the incoming airflow.

Other embodiments of the present disclosure are directed to a cover for a transmission having a drive gear and a driven gear rotatably coupled. The cover includes a first end configured to accommodate the driven gear, a second end opposite the first end configured to accommodate the drive gear, and a middle section between the first and second ends. The first end, second end, and middle section together form an oval "racetrack" path for airflow. The cover also has an air inlet and an air outlet opposite the air inlet. Air introduced through the air inlet moves around the racetrack path. A portion of the air leaves the cover through the air outlet and a portion of the air cycles around the racetrack path. A first portion of the racetrack path between the air inlet and air outlet is wider near the air inlet and becomes progressively narrower between the air inlet and the air outlet, and a second portion of the airflow path between the air outlet and the air inlet is narrower than a narrowest region of the first portion of the racetrack path. The cover also includes a diverter extending from the second flow path over the air inlet to prevent air from the second portion of the flow path from exerting pressure onto air introduced to the cover through the air inlet.

In still further embodiments, the present disclosure is directed to a transmission including a drive gear, a driven gear, and means for rotatably coupling the drive gear to the driven gear to transmit power from the drive gear to the driven gear. The transmission is held within a cover surrounding the drive gear and driven gear. The cover has an elliptical shape to accommodate the round shape of the drive gear and the driven gear, an air inlet configured to direct air into the cover to cool the drive gear and driven gear, and an air outlet configured to release air from the cover after cooling the drive gear and the driven gear. The cover has a lateral interior dimension measured between interior walls of the cover measured in a direction parallel to the axes of rotation of the drive gear and driven gear. The air inlet and air outlet are positioned to direct the air to circulate around the interior of the cover in a racetrack path defined by the elliptical shape of the cover, the racetrack path having a first segment between the air inlet and air outlet on a first side of the cover and a second segment between the air outlet and the air inlet on a second side of the cover. The lateral dimension of the cover on the first side of the cover is widest at the air inlet, narrowest at the air outlet, and ramps from wide to narrow between the air inlet and air outlet. The lateral dimension of the cover on the second side of the cover is narrower than a narrowest point of the first side of the cover. The cover also has a diverter extending from the second side of the cover over at least a portion of the air inlet to prevent air moving over the second side of the cover from exerting pressure on incoming air in the air inlet.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

Figure 1:
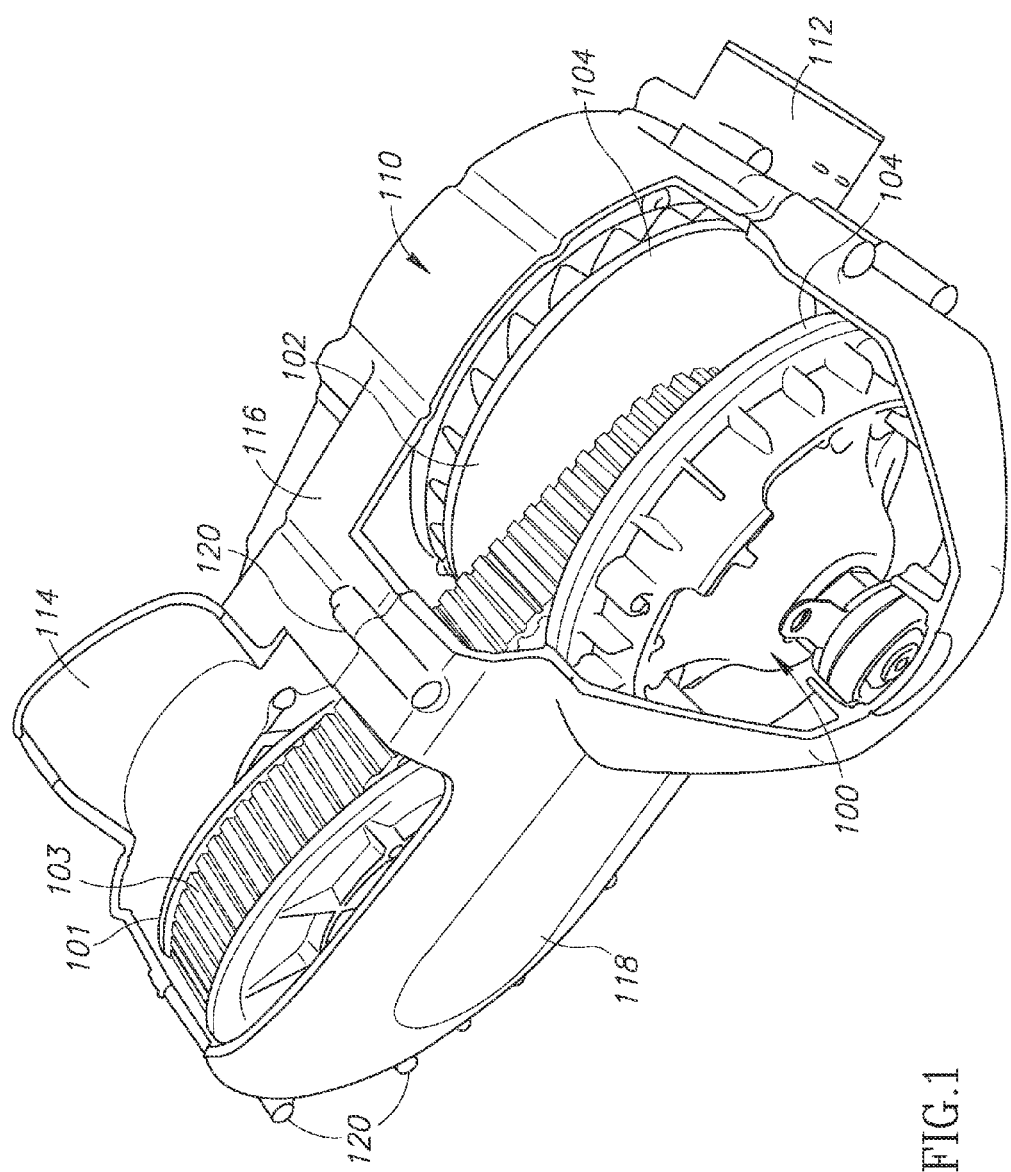
FIG. 1 is a partially cut-away view of a CVT according to embodiments of the present disclosure.

FIG. 1 is a partially cut-away view of a CVT 100 and a CVT cover 110. The CVT 100 has a driven clutch 101, a drive clutch 102, and a belt 103 between the driven clutch 101 and the drive clutch 102. The drive clutch 102 is coupled to the engine crankshaft (not shown), receives power from the engine, and transmits the power through the belt 103 to the driven clutch 101, and eventually from the driven clutch 101 to the wheels. The drive clutch 102 can have two conical sheaves 104 holding the belt 103 between them. Moving the sheaves 104 toward and away from one another changes the effective gear ratio of the drive and driven clutch system. As the sheaves 104 of the drive clutch 102 move farther apart the belt drops to a lower location on the sheaves 104 and to a higher location on the sheaves of the driven clutch 101. Conversely, as the drive sheaves move closer together, the driven sheaves mover farther apart. Thus, the gear ratios from input to output smoothly change, thereby achieving a continuously variable transmission. Although, all the movement of the belt sides along the sides of the sheaves as the clutches are turning creates heat. The belt can only withstand so much heat before it fails under a load. Aspects of the present invention can also be used with other transmissions and with other engine casing components.

The backside (first portion 116) of CVT cover 110 surrounds the side of the CVT 100 adjacent the engine and transmission and protects the moving parts. The cover 110 also serves as a channel through which air moves to cool the sheaves and belt. The cover includes an air inlet 112 near the drive clutch 102 and an air outlet 114 near the driven clutch 101. The positions of the air inlet 112 and outlet 114 can vary slightly, but preferably the air inlet 112 and outlet 114 are on substantially opposing sides of the cover 110 to permit the air to flow over the components of the CVT 100 and out the other side. The cover 110 is formed of two portions: a first portion 116, and a second portion 118. The two portions 116, 118 are split along a line parallel with the belt and are held together by bolts through bosses 120 around the periphery of the cover 110. The bosses are preferably on the external portion of the CVT cover 110 to allow smoother air flow in the interior of the cover for better cooling. The first portion 116 can be on the engine side and the second portion 118 can be on the wheel side, or vice versa. In the illustrated embodiment, the first side 116, in which the air inlet 112 and air outlet 114 are formed, are both on the engine side of the CVT 100. Depending on the configuration of the CVT 100 and engine, the heat builds up more significantly on the engine side of the CVT 100. However, in a different configuration, the heat may be more concentrated elsewhere, in which cover the air inlet 112 and outlet 114 can be positioned accordingly. The air inlet 112 and outlet 114 are also preferably located where a fan can pull air into the cover. In this case, the fan is convenient to situate on the engine side of the drive clutch sheaves 104. The fan moves air into the cover and towards the outlet 114.

Figure 2:
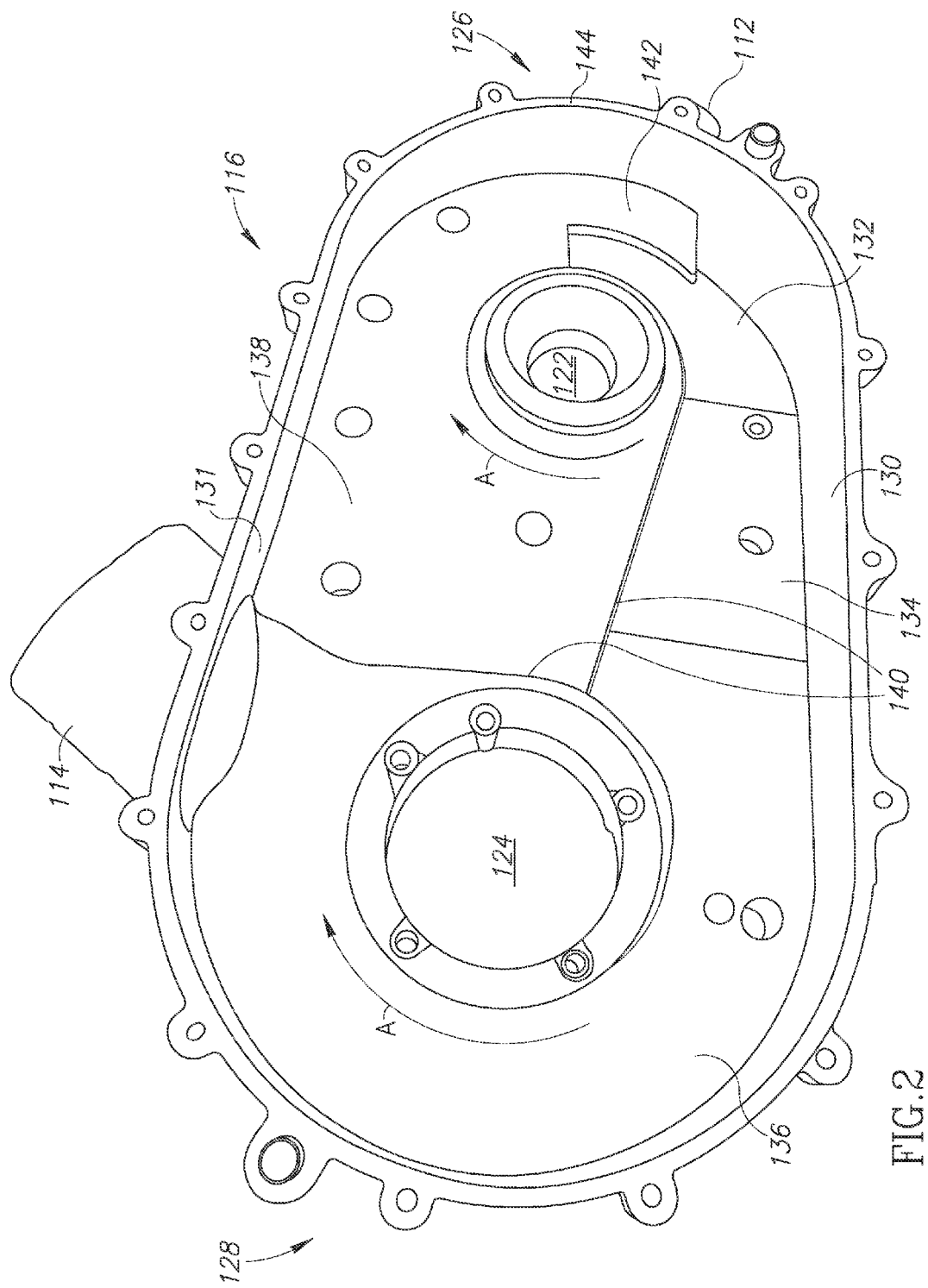
FIG. 2 is an interior view of a portion of the CVT cover according to embodiments of the present disclosure.

FIG. 2 is an interior view of the first portion 116 of the CVT cover 110 according to embodiments of the present invention. The first portion 116 has two holes 122, 124 to accommodate the shafts of the drive clutch 102 and the driven clutch 101, respectively. The clutches 101, 102 turn clockwise as shown by arrows A. The cover 110 has an inlet end 126 near the inlet 112 and an outlet end 128 near the outlet 114. The cover 110 is generally rounded at the ends 126, 128 and somewhat straight in the middle. In some embodiments the inlet end is slightly smaller than the outlet end 128 because the drive clutch 102 is smaller; however, in other embodiments their relative sizes can vary to accommodate the sizes of the driven clutch 101 and drive clutch 102. The air path through the cover 110 therefore starts at the inlet 112, moves into the inlet end 126 and then along a lower region 130 of the cover 110. Some of the air will rotate around the drive clutch, but the majority of the air is moved into contact with the driven clutch following the rounded interior shape of the outlet end 128 and eventually into the outlet 114 and out of the cover 110.

The lateral dimensions of the cover 110 are defined as a distance between the first portion 116 and second portion 118 in a direction parallel with the shafts that pass through the holes 122, 124. The lateral dimension is also reflected in the distance between the first portion 116 of the cover and the inner faces of the drive and driven clutches 102, 101. These dimensions vary along the airflow path to improve the air pressure at various points along the flow path. The front portion 116 has a deep region 132, followed by a ramp region 134, followed next by a shallow region 136. The deep region 132 has a large lateral dimension to permit air to enter at a relatively lower air pressure when compared to a conventional CVT cover with a uniform lateral dimension. The lateral dimension of the deep region 132 is preferably between 70 and 100 mm. In one preferred embodiment, the dimension is approximately 90 mm. In the ramp region 134 the lateral dimension diminishes gradually until reaching the shallow region 136. The lateral dimension of the shallow region 136 is preferably between 50 and 80 mm. In one preferred embodiment, the dimension is approximately 65 mm. The ramp region 134 also widens in the transverse direction perpendicular to the lateral direction. The shallow region 136 begins approximately halfway between the first and second holes and continues around the outlet end 128 until reaching the outlet 114. In other embodiments, the ramp region can begin nearer to the inlet 112 and end nearer to the outlet 114 for an even more gradual pressure change. The slope of the ramp region is preferably approximately 0 to 20 degrees. In some instances, the space constraints on the outside of the cover (other vehicle components that must be fitted) will dictate a hump in the ramp or a certain angle. In any case, the cover is optimized to have the least turbulence (e.g., the smoothest flow) through the flow path and to the exit. This will maximize cool air flow with the least resistance to air entering the inlet port for the given constraints.

The cover 110 also includes a high region 138 that extends from the air outlet 114 to the air inlet 112 on an upper side 131 of the cover 110. A portion of the air in the cover moves from the shallow region 136 over the high region 138 and around the driven shaft again before merging with the newly introduced airflow from the air inlet 112. A ridge 140 separates the high region 138 from the deep region 132, the ramp region 134, and the shallow region 136. The ridge 140 extends tangentially from the first hole 122 and reaches approximately to a midpoint of the second hole 124. A portion of the high region 138 at a perimeter of the cover 110 near the air inlet 112 is a divider 142 that directs air passing over the high region 138 back into the main airflow, and prevents the air from exerting outward pressure on the inlet air. The divider 142 covers approximately half the distance between the cover shell 144 and the first hole 122 measured in a radial dimension outward from the first hole 122.

As the air enters the cover 110 from the inlet 112, the laterally width dimensions of the flow path therefrom begin large and become progressively smaller until the air exits the cover 110 at the outlet 114. The effect of this structure is to reduce the pressure drop in the air when introduced to the cover 110 thereby improving efficiency. Conventional designs have an abrupt change in dimension, which causes a larger pressure spike, in turn requiring more pressure to maintain airflow through the cover 110. In some covers, the abrupt dimension change causes the internal air pressure to be large enough to cause air to blow back out of the inlet 112 hindering the efficiency of the cooling system.

Figure 3:
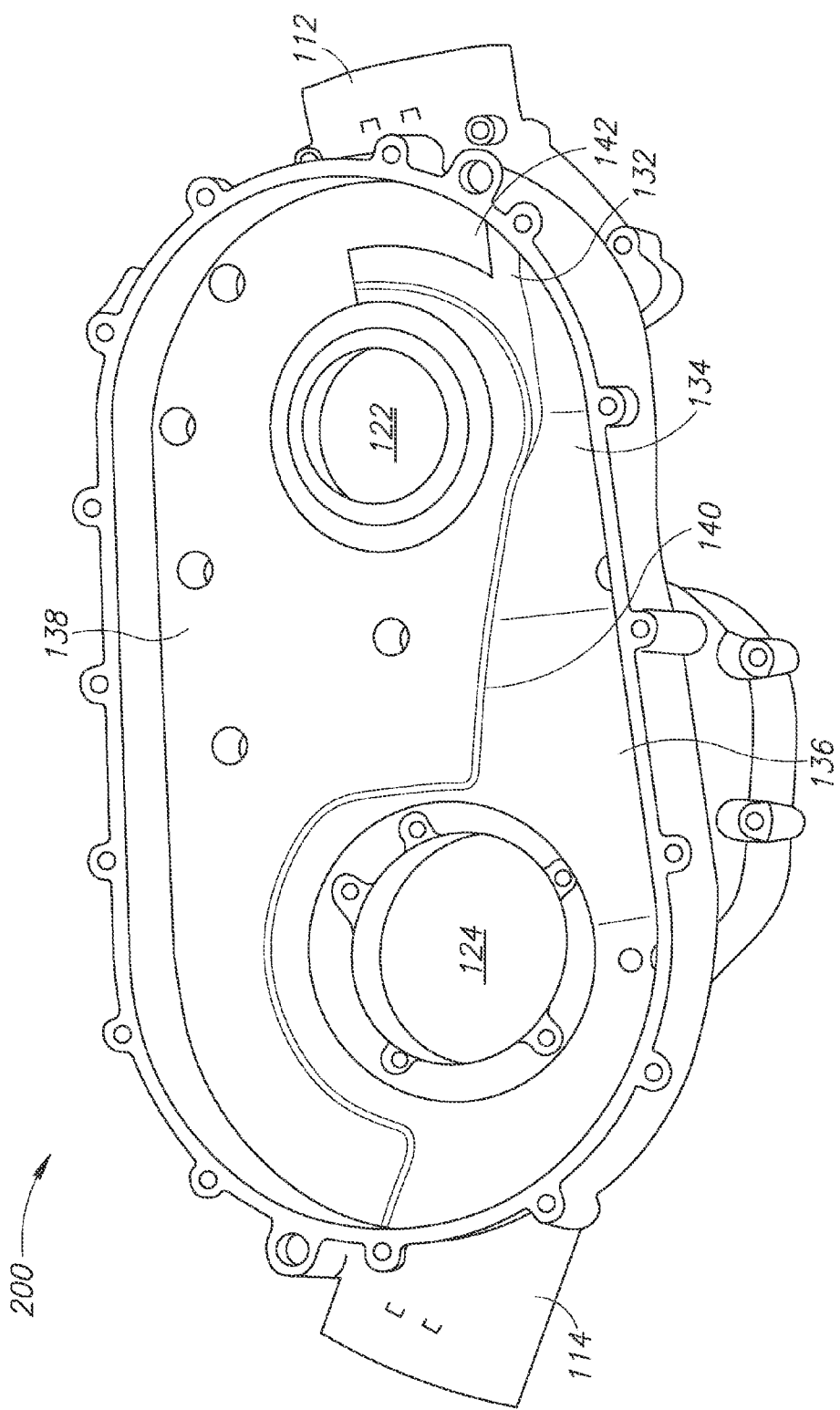
FIG. 3 is an interior view of a portion of the CVT cover according to further embodiments of the present disclosure.

FIG. 3 is an isometric view of a portion of a CVT cover 200 according to embodiments of the present disclosure in which the outlet is oriented differently relative to the cover 110. The cover 200 includes features generally similar to features of other covers described herein including the inlet 112, outlet 114, deep region 132, ramp region 134, shallow region 136, high region 138, and ridge 140. The outlet 114 is at approximately the 9 o'clock position relative to the second hole 124.

By comparison, the outlet 114 of FIG. 2 is at approximately the 1 o'clock position. The inlet 112 can similarly be oriented differently according to the dimensions of a given CVT. The cover itself can be made using a mold or another suitable manufacturing technique. In some embodiments the cover has a uniform thickness throughout the cover.

In either of these preferred embodiments, the channeling of the cooling air creates less backpressure and more flow through of fresh air to better cool the clutches and belt.

Figure 4A:
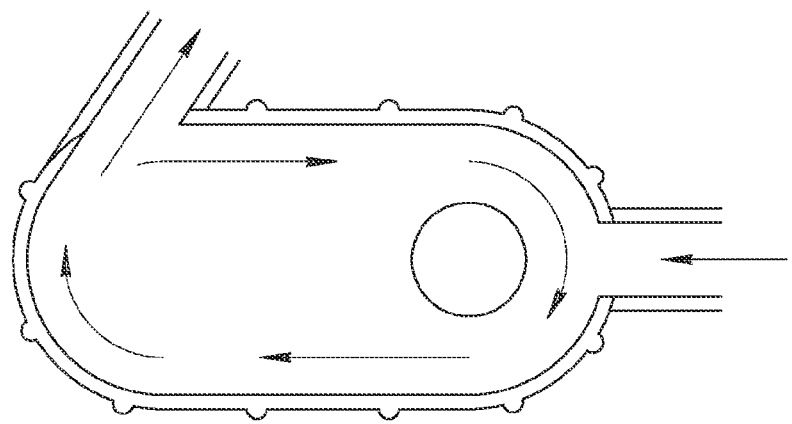
FIGS. 4A-E illustrate CVT cover alternate embodiments.

FIGS. 4A-E illustrate various configurations of CVT cover air channeling structures. In FIG. 4A the cover does not include air channeling structures, other than an open, smooth case. In this instance a significant amount of the air flow is recirculated back to the inlet. This recirculated air can create resistance to incoming air such that the flow of cool air into the cover is reduced. The recirculating air is also warmer, thus reducing the clutch and belt cooling.

Figure 4B:
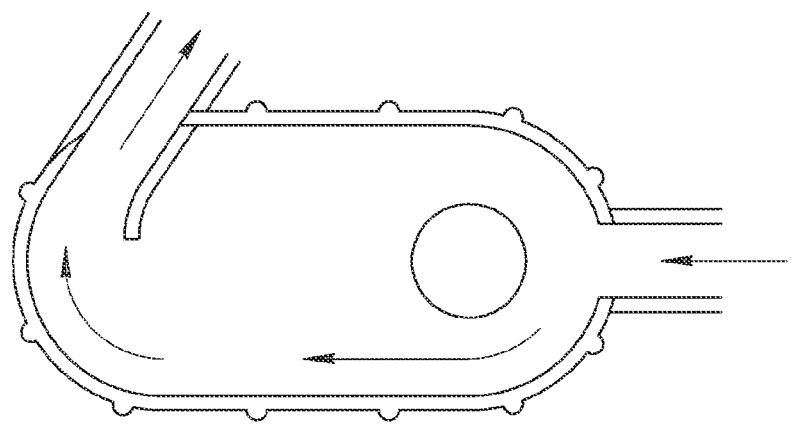

FIG. 4B shows a slightly modified cover with a diversion wall to direct the air out of the cover near the outlet and driven clutch (not shown in this figure). The wall causes less recirculation and better air flow with less resistance at the inlet and cooler air overall.

Figure 4C:
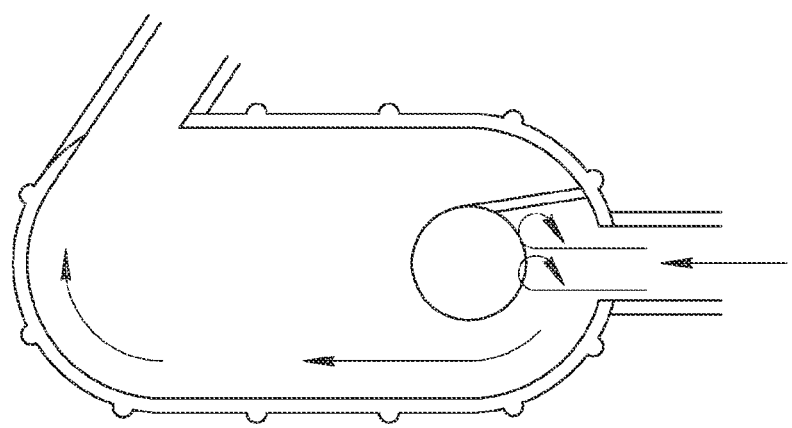
Figure 4D:
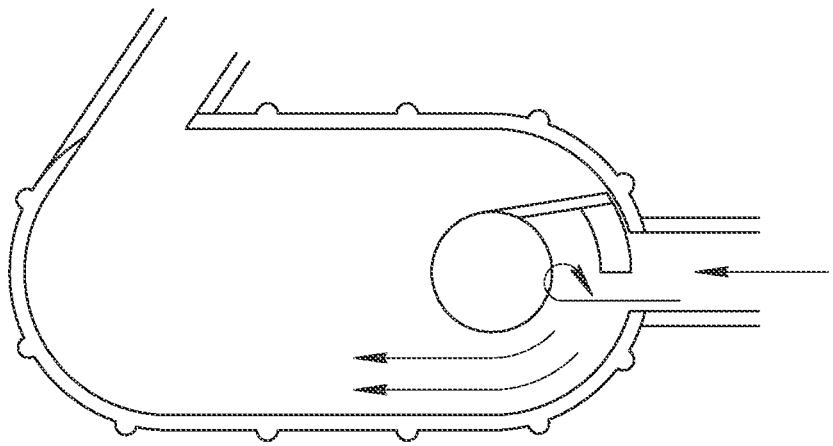
Figure 4E:
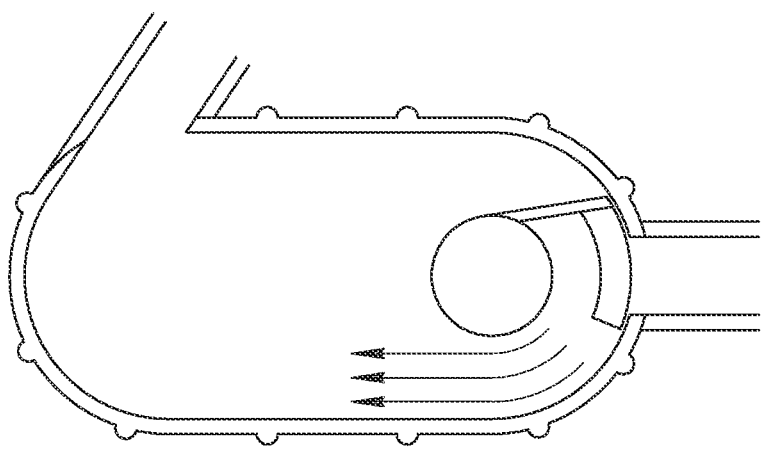

FIGS. 4C-E illustrate different structures near the inlet that affect flow. These structures may be used in conjunction with the exit structures discussed above with reference to FIGS. 4A and 4B. FIG. 4C includes only a drop wall from the upper portion of the cover to the lower portion adjacent the inlet. Without a significant diversion for recirculating air flow is not optimized. Thus, incoming air becomes turbulent as it enters the recirculating air flow path.

FIG. 4D includes a recirculating air flow diverter to channel recirculating air above the main inlet flow path. Some turbulence occurs but flow is better than in 4C above.

FIG. 4E includes a larger diverter for the recirculating air. This arrangement puts the recirculating air in a laminar flow path with the entering air to create the best flow with the least resistance. In alternate embodiments, the shield may be larger or smaller to achieve desired flow consistent with packaging and other design parameters.

While the preferred embodiments of the invention have been illustrated and described, as noted above, many changes can be made without departing from the spirit and scope of the invention. Accordingly, the scope of the invention is not limited by the disclosure of the preferred embodiments. For example, the present invention can include other mechanical equivalents that prevent an axle nut from loosening from the axle, including a retaining arm extending from the axle nut to a single lug or to another portion of the wheel. Other embodiments are also possible. Accordingly, the invention should be determined entirely by reference to the claims that follow.

The embodiments of the invention in which an exclusive property or privilege is claimed are defined as follows:

1. A case for a continuously variable transmission having a drive clutch and a driven clutch held by a drive shaft and a driven shaft respectively, wherein the drive shaft and the driven shaft are offset in a longitudinal direction, each of the drive and the driven shafts extends in a lateral direction that is orthogonal to the longitudinal direction, and a vertical direction is transverse to each of the longitudinal direction and the lateral direction, wherein the drive and driven clutches include side faces, the case comprising:

an air inlet extending through an inlet end of the case;

an air outlet extending through an outlet end of the case, wherein the outlet end is substantially opposite the inlet end of the case; and an airflow channel within the case that guides at least a portion of flowing air from the air inlet downstream to the air outlet, wherein the airflow channel has a ramp region that is downstream from the air inlet and upstream from the air outlet and, wherein the ramp region includes a lower internal surface, an upper internal surface offset from the lower internal surface in the vertical direction, an upstream ramp portion, and a downstream ramp portion that is downstream from the upstream ramp portion, wherein a vertical height of the ramp region corresponds to a vertical distance, in the vertical direction, between the upper and the lower internal surfaces of the ramp region and, wherein the vertical distance between the upper and the lower internal surfaces of the ramp region varies along the longitudinal direction such that a vertical height of the upstream ramp portion is less than a vertical height of the downstream ramp portion.

2. The case of claim 1, further comprising a drive shaft hole configured and arranged to receive the drive shaft, a driven shaft hole configured and arranged to receive the driven shaft, a high region that is vertically above the ramp region, and a ridge that is intermediate, in the vertical direction, the high region and the ramp region such that the ridge at least partially separates the high region from the ramp region and extends in the longitudinal direction and tangentially from the drive shaft hole to the driven shaft hole, wherein the ridge at least partially restricts a portion of the airflow channel that is downstream of the air outlet and the upper internal surface of the ramp region is at least partially formed by the ridge.

3. The case of claim 1, wherein the airflow channel further includes a shallow region that is downstream of the ramp region and a deep region that is upstream of the ramp region, wherein a lateral depth of the airflow channel corresponds to a lateral distance, in the lateral direction, between an inboard lateral surface and an outboard lateral surface of the airflow channel, and wherein, within the ramp region, the lateral distance between the inboard and the outboard lateral surfaces of the airflow channel varies along the longitudinal direction such that a lateral depth of the deep region is greater than a lateral depth of the shallow region.

4. The case of claim 3, wherein the lateral depth of the airflow channel is greatest in a portion of the deep region that is positioned adjacent the air inlet.

5. The case of claim 3, wherein the lateral depth of the airflow channel is smallest in a portion of the shallow region that is positioned adjacent the air outlet.

6. The case of claim 3, wherein a lateral depth of the upstream ramp portion is greater than a lateral depth of the downstream ramp portion of the ramp region.

7. The case of claim 3, wherein a vertical height of the shallow region is greater than a vertical height of the deep region.

8. The case of claim 1, further comprising an air diverter that is adjacent the air inlet, the air diverter guiding flowing air downstream from the air outlet into a portion of the airflow channel that is downstream from the air inlet.

9. The case of claim 1, further including a drive shaft hole and a driven shaft hole, wherein at least a portion of the airflow channel extends in the longitudinal direction and along adjacent portions of the case that form the drive and the driven shaft holes.

10. The case of claim 1, wherein the case further comprises, a first case part, a second case part, and a plurality of bosses for coupling the first and the second case parts together, the plurality of bosses being positioned on an external portion of the case, wherein an interior surface of the case is adjacent the airflow channel and is substantially smooth.

11. A cover for a transmission having a drive shaft and a driven shaft, wherein the drive shaft and the driven shaft are offset in a longitudinal direction, each of the drive and driven shafts extends in a lateral direction that is orthogonal to the longitudinal direction, and a vertical direction is transverse to each of the longitudinal direction and the lateral direction, the cover comprising:
a first cover portion;
a second cover portion that is configured and arranged to couple to the first cover portion;
a first hole in one of the first or the second cover portions for receiving the drive shaft of the transmission;
a second hole in the one of the first or the second cover portions for receiving the driven shaft of the transmission;
an air inlet disposed near the first hole;
an air outlet disposed near the second hole;
a deep region disposed near the air inlet;
a shallow region disposed near the air outlet;
a ramp region, wherein at least a portion of the ramp region is disposed intermediate, in the longitudinal direction, the deep region and the shallow region and intermediate, in the longitudinal direction, the air inlet and the air outlet, and
wherein the ramp region including a lower internal surface that includes a first normal vector, an upper internal surface that includes a second normal vector and is offset from the lower internal surface in the vertical direction, an upstream ramp portion, and a downstream ramp portion that is disposed intermediate, in the longitudinal direction, the upstream ramp portion and the shallow region, wherein each of the first and the second normal vectors extend in the vertical direction, and
wherein a vertical height of the ramp region corresponds to a vertical distance, in the vertical direction, between the upper and the lower internal surfaces of the ramp region and,
wherein the vertical distance between the upper and the lower internal surfaces of the ramp region varies along the longitudinal direction such that a vertical height of the upstream ramp portion is less than a vertical height of the downstream ramp portion, and
wherein at least a portion of air flowing through the cover enters the case through the air inlet, flows downstream through the deep region, the ramp region, and the shallow region, and exits the cover through the air outlet;
a high region disposed intermediate, in the longitudinal direction, the air outlet and air inlet, wherein the high region is configured and arranged to direct a portion of air flowing downstream from the shallow region to merge with incoming flowing air from the air inlet;
a ridge disposed intermediate, in the longitudinal direction, the first and the second holes that at least partially separates the ramp region from the high region; and
a diverter disposed intermediate the high region and the air inlet and configured and arranged to direct at least a portion of air flowing from the high region, such that a pressure exerted by the directed air on incoming air from the air inlet is at least partially attenuated.

12. The cover of claim 11 wherein the ridge extends tangentially from the first hole and to the second hole.

13. The cover of claim 11 wherein
the deep region includes a first inboard lateral surface that includes a third normal vector and a first outboard surface that includes a fourth normal vector and is offset from the first inboard surface in the lateral direction, wherein each of the third and the fourth normal vectors extend in the lateral direction, and wherein a lateral depth of the deep region corresponds to a first lateral distance, in the lateral direction, between the first inboard lateral surface and the first outboard lateral surface of the deep region;
the shallow region includes a second inboard lateral surface that includes a fifth normal vector and a second outboard lateral surface that includes an sixth normal vector and is offset from the second inboard surface in the lateral direction, wherein each of the fifth and the sixth normal vectors extend in the lateral direction, and wherein a lateral depth of the shallow region corresponds to a second lateral distance, in the lateral direction, between the second inboard lateral surface and the second outboard lateral surface of the shallow region;
the ramp region includes a third inboard lateral surface including a seventh normal vector and a third outboard lateral surface that includes an eighth normal vector and is offset from the third inboard lateral surface in the lateral direction, wherein each of the seventh and the eighth normal vectors extend in the lateral direction, and
a lateral depth of the ramp region corresponds to a third lateral distance, in the lateral direction, between the third inboard lateral surface and the third outboard lateral surface of the ramp region, and
the third lateral distance varies along the longitudinal direction such that the lateral depth of the deep region is greater than the lateral depth of the shallow region.

14. The cover of claim 13 wherein the lateral depth of the deep region is between 70 and 100 mm and the lateral depth of the shallow region is between 50 and 80 mm.

15. The cover of claim 13 wherein the lateral depth of the ramp region continuously decreases along the longitudinal direction from the upstream ramp portion to the downstream ramp portion and the vertical height of the ramp region continuously increases along the longitudinal direction from the upstream ramp portion to the downstream ramp portion.

16. The cover of claim 11 wherein a central axis of the air inlet is substantially parallel with a virtual line in the longitudinal direction and passing through a center of the first hole.

17. The cover of claim 11 wherein a central axis of the air outlet forms an angle of approximately 66 degrees with a virtual line in the longitudinal direction and passing through a center of the second hole.

18. The cover of claim 11 wherein a central axis of the air outlet is substantially parallel with a virtual line in the longitudinal direction and passing through a center of the second hole.

19. The cover of claim 11 wherein the diverter segments a portion of the deep region.

20. The cover of claim 11 wherein the diverter includes a ring segment positioned adjacent the air inlet and concentric with the first hole.

21. The cover of claim 20 wherein the diverter partitions approximately half of the deep region into two separate lateral portions.

22. The cover of claim 11 wherein a slope of the vertical height of the ramp region is less than 20 degrees.

23. The cover of claim 11 wherein a rotation of at least one of the drive shaft or the driven shaft at least partially enables the air flowing from the air inlet, through the deep region, the ramp region, the shallow region, and exiting the cover through the air outlet.

24. A cover for a transmission, wherein the transmission includes a drive shaft rotatably coupled to a drive clutch and driven shaft rotatably coupled to a driven clutch, wherein the drive clutch is rotatably coupled to the driven clutch, wherein the drive shaft and the driven shaft are offset in a longitudinal direction, each of the drive and the driven shafts extends in a lateral direction that is orthogonal to the longitudinal direction, and a vertical direction is transverse to each of the longitudinal direction and the lateral direction, the cover comprising:
- a first end configured and arranged to accommodate the driven clutch;
- a second end opposite the first end and configured and arranged to accommodate the drive clutch;
- a middle section, wherein the first end, the second end, and the middle section form an airflow path;
- an air inlet providing access to a first port of the airflow path;
- an air outlet providing access to a second port of the airflow path that is downstream of the first port, wherein air introduced to the airflow path through the air inlet flows through the airflow path, and wherein a portion of the flowing air exits the airflow path through the air outlet and another portion of the flowing air continues flowing through the airflow path;
- wherein the airflow path includes a first portion that is downstream of the air inlet, a ramp portion that is downstream of the first portion, and a second portion that is downstream of the ramp portion and upstream of the air outlet; and
- wherein the ramp portion includes a lower internal surface, an upper internal surface that is offset from the lower internal surface in the vertical direction, an upstream ramp sub-portion and a downstream ramp sub-portion that is downstream from the upstream ramp sub-portion,
- wherein a vertical height of the ramp portion corresponds to a vertical distance, in the vertical direction, between the upper and the lower internal surfaces of the ramp portion and a transverse height of the upstream ramp sub-portion is less than a transverse height of the downstream ramp sub-portion.

25. The cover of claim 24, wherein the first end is rounded to accommodate the driven clutch and the second end is rounded to accommodate the drive clutch.

26. The cover of claim 24 further comprising
a diverter extending between the second portion of the airflow path and the air inlet that is configured and arranged to prevent at least a portion of air flowing from the second portion of the airflow path from exerting pressure on air introduced to the airflow path through the air inlet.

27. The cover of claim 24 wherein
the first portion of the airflow path includes a first inboard lateral surface and a first outboard lateral surface that is offset from the first inboard lateral surface in the lateral direction and a lateral depth of the first portion of the airflow path corresponds to a first lateral distance, in the lateral direction, between the first inboard lateral surface and the first outboard lateral surface of the first portion of the airflow path;

the second portion of the airflow path includes a second inboard lateral surface and a second outboard lateral surface that is offset from the second inboard lateral surface in the lateral direction and a lateral depth of the second portion of the airflow path corresponds to a second lateral distance, in the lateral direction, between the second inboard lateral surface and the second outboard lateral surface of the second portion of the airflow path, and
wherein the lateral depth of the second portion of the airflow path is less than the lateral depth of the first portion of the airflow path.

28. A transmission, comprising:
a drive clutch;
a driven clutch;
a coupler configured and arranged to rotatably couple the drive clutch to the driven clutch and transmit power from the drive clutch to the driven clutch;
a cover housing the drive clutch and the driven clutch, wherein the cover has a substantially curved shape;
an air inlet configured and arranged to receive air flowing into the cover; and
an air outlet configured and arranged to direct air flowing out of the cover;
wherein the cover has a lateral width between a first lateral interior wall portion and a second lateral interior wall portion of the cover and in a lateral direction that is substantially parallel to an axis of rotation of at least one of the drive clutch or the driven clutch;
wherein the air inlet is further configured and arranged to direct flowing air received through the air inlet to flow through an airflow path internal to the cover,
wherein the airflow path includes a first segment that is downstream from the air inlet, a ramp segment that is downstream from the first segment, and a second segment that is downstream from the ramp segment and upstream of the air outlet;
wherein the ramp segment includes an upstream ramp portion and a downstream ramp portion that is downstream of the upstream ramp portion;
wherein a transverse height of the airflow path corresponds to a transverse distance between an upper and a lower internal surface of the airflow path, wherein the transverse distance is in a direction that is substantially transverse to both the lateral direction of the lateral width and another direction corresponding to the flowing air in the airflow path; and
wherein the transverse height of the upstream ramp segment is less than the transverse height of the downstream ramp segment.

29. The transmission of claim 28 wherein the lateral width of the ramp segment of the airflow path continuously decreases along a downstream direction from the upstream ramp segment to the downstream ramp segment.

30. The transmission of claim 28 wherein the transverse height of the ramp segment of the airflow path continuously increase along a downstream direction from the upstream ramp segment to the downstream ramp segment.

* * * * *